United States Patent [19]

Batzer et al.

[11] 4,305,823
[45] Dec. 15, 1981

[54] SEMIPERMEABLE MEMBRANES FROM MODIFIED POLYMERS

[75] Inventors: Hans Batzer, Arlesheim, Switzerland; Joel Sinnreich, Bensheim, Fed. Rep. of Germany

[73] Assignee: Ciba-Geigy Corporation, Ardsley, N.Y.

[21] Appl. No.: 172,313

[22] Filed: Jul. 25, 1980

Related U.S. Application Data

[62] Division of Ser. No. 13,501, Feb. 21, 1979, Pat. No. 4,249,000.

[30] Foreign Application Priority Data

Feb. 21, 1978 [CH] Switzerland .................... 1847/78

[51] Int. Cl.$^3$ .............................................. B01D 31/00
[52] U.S. Cl. ................................. 210/500.2; 210/654; 210/655; 536/66
[58] Field of Search ................... 210/500.2, 321.1, 654, 210/655; 536/66, 36, 64, 65, 76, 84, 85, 87, 69; 525/54, 61, 193, 221, 222; 55/16, 158; 422/48

[56] References Cited

U.S. PATENT DOCUMENTS

| | | | |
|---|---|---|---|
| 1,867,123 | 7/1932 | Weihe | 536/36 |
| 2,689,863 | 9/1954 | Broderick et al. | 536/66 |
| 2,759,925 | 8/1956 | Hiatt et al. | 536/66 |
| 2,794,799 | 6/1957 | Hiatt et al. | 536/66 |
| 2,856,399 | 10/1958 | Mench et al. | 536/66 |
| 3,642,773 | 2/1972 | Littman | 536/65 |

FOREIGN PATENT DOCUMENTS

| | | | |
|---|---|---|---|
| 37-11450 | 8/1962 | Japan | 536/66 |
| 360058 | 11/1931 | United Kingdom | 536/64 |

OTHER PUBLICATIONS

H. Holtschmidt, Makrol Chem. 13, 141, (1954).

Primary Examiner—Frank A. Spear, Jr.
Attorney, Agent, or Firm—Luther A. R. Hall

[57] ABSTRACT

Polymers from the group consisting of cellulose and its ester and ether derivatives, of polyvinyl alcohol and its ester derivatives, copolymers with vinyl esters and homopolymers and copolymers of acrylates and methacrylates are modified with monofunctional or difunctional cyclic β-ketonic acids or their esters, in particular with succinylsuccinic acid or its ester derivatives. The modified polymers are particularly suitable for obtaining semi-permeable membranes for osmotic separation methods.

15 Claims, No Drawings

SEMIPERMEABLE MEMBRANES FROM MODIFIED POLYMERS

This is a divisional of application Ser. No. 13,501, filed on Feb. 21, 1979, now U.S. Pat. No. 4,249,000, issued Feb. 3, 1981.

The present invention relates to polymers from the group consisting of cellulose esters and ethers, of polyvinyl alcohol and the ester derivatives thereof, of copolymers with vinyl esters and of the homopolymers and copolymers of acrylates and methacrylates which are modified with cyclic β-ketonic acids or their esters, in particular with succinylsuccinic acid or its esters, a process for the manufacture of said polymers and the use thereof for obtaining membranes for methods of separating substances, for example chromatography, electrodialysis and, in particular, hyperfiltration (reverse osmosis).

The utilisation of reverse osmosis for water treatment, for example for desalinating sea water, purifying brackish water or purifying wastewaters, has attained economic importance in recent years. Plastic membranes, on whose mechanical strength, chemical resistance and separating efficiency great demands are made, are used for such treatment methods. Membranes made of cellulose esters and polyamides are chiefly used. Such membranes still exhibit deficiencies as regards their separating efficiency and there is consequently a need for improvement in this respect. The biological degradation of the membranes is also observed to be a substantial drawback, which becomes especially apparent in the loss of the mechanical strength.

The present invention has for its object the provision of modified polymers which are suitable for methods of separating substances, in particular for obtaining semipermeable membranes for hyperfiltration methods, and which eliminate the deficiencies referred to above.

Accordingly, the present invention provides polymers from the group consisting of cellulose ester and ether derivatives, of polyvinyl alcohol and the ester derivatives thereof, copolymers with vinyl esters and of the homopolymers and copolymers of acrylates and methacrylates, said polymers containing radicals of monofunctional or difunctional cyclic β-ketonic acids or their esters which are bonded through ester groups. In the case of polymers which contain hydroxyl groups, the radicals are bonded direct through the carboxyl groups of the β-ketonic acids. In the case of polymers which contain carboxyl groups, the β-ketonic acids are bonded through their acid group by means of divalent hydrocarbon radicals R of aliphatic, cycloaliphatic or aromatic character according to the scheme

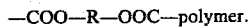

Examples of cyclic β-ketonic acids which are known per se are: 1-carboxycyclopentan-2-one, 1,4-dicarboxycyclopentane-2,3-dione, 1,3-dicarboxycyclopentane-2,3-dione, 1,3-dicarboxycyclopentane-2,4-dione, 2,3-dicarboxycyclohexane-1,4-dione, 3,5-dicarboxycyclohexane-2,6-dione, 1-carboxycyclohexan-2-one and, in particular, 3,6-dicarboxycyclohexane-1,4-dione (succinylsuccinic acid).

Accordingly, especially preferred radicals of cyclic β-ketonic acids are those of succinylsuccinic acid or its ester derivatives of the formula I

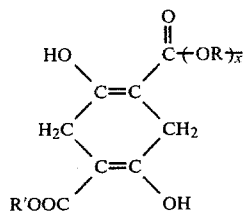

wherein R represents a divalent hydrocarbon radical of aliphatic, cycloaliphatic or aromatic character and R' represents a monovalent hydrocarbon radical of aliphatic, cycloaliphatic or aromatic character which is unsubstituted or substituted by hydroxyl, and x, in the case of the cellulose derivatives and polyvinyl alcohols and their derivatives, is 0, and, in the case of the acrylate and methacrylate homopolymers and copolymers, is 1.

R in formula I as divalent hydrocarbon radical of aliphatic character can be linear or branched alkylene which is interrupted by oxygen and which preferably contains 2 to 12, in particular 2 to 6 and most preferably 2 or 4, carbon atoms. Examples are: ethylene, 1,2- or 1,3-propylene, 1,2-, 1,3- or 1,4-butylene, pentylene, neopentylene, hexylene, octylene, dodecylene and, for example, the radicals of the formula $-(C_nH_{2n}O)_m$ derived from polyoxaalcohols, wherein m is a value from 2 to 10 and n is an integer from preferably 2 to 4. Examples of these radicals are the radicals of diethylene, triethylene or tetraethylene glycol, dipropylene glycol or dibutylene glycol.

R in formula I as divalent hydrocarbon radical of cycloaliphatic character can be cycloalkylene, alkylenecycloalkyl and bisalkylenecycloalkyl. Examples are: cyclopentylene, cycloheptylene and, in particular, cyclohexylene. Further examples are methylenecyclohexyl and 1,4-bis-methylenecyclohexane.

R in formula I can also be a divalent hydrocarbon radical of aromatic character, in particular one of phenyl-aromatic character, for example phenylene, benzylene and xylylene. Preferably, R in formula I is alkylene.

R' in formula I as monovalent hydrocarbon radical which is unsubstituted or substituted by hydroxyl can contain 1 to 30, preferably 1 to 22, in particular 1 to 12 and most preferably 1 to 6, carbon atoms, and be alkyl, hydroxyalkyl, cycloalkyl, aryl, alkaryl or aralkyl. The alkyl and hydroxyalkyl radicals are preferred. These can be linear or branched and can contain preferably 1 to 12 and, in particular, 1 to 6, carbon atoms. Examples of R' are: methyl, ethyl, propyl, isopropyl, butyl, isobutyl, pentyl, hexyl, octyl, dodecyl, hexadecyl, octadecyl, eicosyl, β-hydroxyethyl, γ-hydroxypropyl, δ-hydroxybutyl, hydroxycyclohexyl, hydroxyphenyl, cyclopentyl, methylcyclohexyl, cyclohexyl, cycloheptyl, phenyl, naphthyl, benzyl, β-phenethyl, methylphenyl, butylphenyl, octylphenyl, nonylphenyl, methylbenzyl, octylbenzyl.

Preferred polymers are cellulose ester and cellulose ether derivatives, of which the ester derivatives are particularly preferred.

Ester and ether derivatives of cellulose are, for example, nitrocellulose, acetyl cellulose, cellulose triacetate, cellulose acetopropionate, cellulose acetobutyrate, cellulose tripropionate, cellulose tributyrate, cellulose benzoate, methyl cellulose, oxyethyl cellulose, carboxymethyl cellulose, ethyl cellulose, benzyl cellulose. Cellulose acetate with a different degree of acetylation is preferred.

The cellulose polymers of the invention preferably contain in addition hydroxyl groups. This is particularly advantageous in the use of osmosis membranes.

A further suitable polymer is polyvinyl alcohol and its partially or completely esterified derivatives. Ester derivatives are in particular polyvinyl acetate and polyvinyl propionate, but also those containing other acyl radicals, such as benzoyl, formyl, butyryl or stearyl.

A further group of polymers comprises the copolymers of vinyl esters (vinyl acylates) with one or more other comonomers. They can be block copolymers or statistical polymers. Examples of comonomers are:

α-olefins, such as ethylene, propylene, butylene, isobutylene, methylbutene-1, methylpentene-1 and butadiene, isoprene, styrene, acrylonitrile, methacrylate, methylmethacrylate, ethyl acrylate, butyl acrylate, vinyl chloride, vinylidene chloride, acrylamide, dimethyl butadiene, chloroprene, methylstyrene, vinyl carbazole, vinyl fluoride, acrylic acid.

Examples of copolymers are: ethylene/vinyl acetate, vinyl chloride/vinyl acetate, propylene/vinyl acetate, vinyl acetate with other vinyl esters or acrylic esters, for example acrylic acid ester, fumaric acid ester, maleic acid ester, vinyl laurate, vinyl stearate.

A further group comprises the homopolymers of acrylic acid, methacrylic acid and, in particular, the esters thereof with, for example, methanol, ethanol, propanol, butanol, dodecanol. To this group also belong the copolymers with, for example, one or more of the above mentioned copolymers. Examples are: polymethacrylate, polymethylmethacrylate, polyethylacrylate or polyethylmethacrylate, polybutylacrylate, copolymers of methylacrylate or ethylacrylate or methylmethacrylate or ethylmethacrylate with acrylonitrile, styrene, vinyl chloride, butadiene, such as acrylonitrile/methacrylate, acrylonitrile/methylmethacrylate, acrylonitrile/styrene/methacrylate, styrene/acrylic acid, methacrylate/butadiene/styrene, ethylene/acrylic acid, ethylene/ethylacrylate.

The average number of radicals of the formula I bonded to the polymer side chains and contained in the cellulose polymers and their derivatives is, per monomer unit, up to 1, preferably 0.01 to 1, in particular 0.05 to 0.8 and, most preferably, 0.1 to 0.5.

The average number of radicals of the formula I bonded to the polymer side chains and contained in the vinyl alcohol, vinyl ester, acrylate and methacrylate polymers and copolymers is, per functional monomer unit, up to 1, preferably 0.01 to 1, in particular 0.05 to 0.9, and, most preferably, 0.1 to 0.5. It has been found that the desired modification is effected with a relatively small content of radicals of cyclic β-ketonic acids.

The preferred thermoplastic polymers of the invention are obtained by transesterifying or esterifying cellulose esterification derivatives or etherification derivatives containing hydroxyl groups, polyvinyl alcohol, the ester derivatives thereof, copolymers with vinyl esters or homopolymers or copolymers of acrylates or methacrylates in the melt phase or preferably solutions of the polymers, in an inert solvent, with monofunctional or difunctional cyclic β-ketonic acids or esters.

The polymers used as starting materials are for the most part commercially available or they can be easily prepared by known polymerisation methods.

The cyclic β-ketonic acids and their esters are known. The succinylsuccinates are also commercially available products or they can be easily prepared. They are also described in the literature (cf. for example H. Holtschmidt, Makromol. Chemie 13, 1954, page 141 ff.).

Depending on the starting polymers, two different types of ester group bonding are obtained, which bond the radicals of the cyclic β-ketonic acids to the polymer chains:

(1) If hydroxylated polymers (cellulose derivatives, polyvinyl alcohol) or their esterification derivatives are used, products are obtained in which radicals of the formula I are bonded to the polymer chains through oxygen atoms of the carboxyl group of the β-ketonic acids (x in formula I is 0).

(2) If starting polymers containing carboxyl or carboxylate side groups (acrylates and methacrylates) are used, polymers are obtained in which radicals of the β-ketonic acids are bonded to these carboxylate side groups through divalent hydrocarbon radicals (x in formula I is 1).

Accordingly, it is possible in (1) for example to use succinylsuccinates, including the ester derivatives which contain hydroxyl groups. Preferably, lower alkyl esters are used. In (2), it is only possible to use succinylsuccinates of the formula I, wherein one R' or both R' represent a hydrocarbon radical of aliphatic, cycloaliphatic or aromatic character which is substituted by hydroxyl. Especially in this case, R' is alkylene of preferably 2 to 6 carbon atoms.

In (1), reaction temperatures of preferably at least 120° C., in particular 120° to about 180° C., are used, and in (2), the reaction temperatures are from 0° C. to about 120° C., in particular from 50° to 120° C.

In the process in the melt phase, the temperature depends on the melting range of the polymer. Advantageously, the temperature in this process is up to about 100° C., preferably not more than 50° C., above the melting point of the polymer.

The catalysts conventionally employed in transesterification and esterification reactions can be used for the process, for example amines, inorganic or organic acids, for example hydrochloric acid or p-toluenesulfonic acid, or else metals or metal compounds, such as the oxides and salts or organic compounds of calcium, magnesium, zinc, cadmium, mangenese, titanium, tin and cobalt.

The water of reaction formed during the esterification, or the alcohols and carboxylic acid esters formed during the transesterification, can be removed from the reaction mixture during or after the reaction, for example by azeotropic or simple distillation.

Suitable inert solvents for the process are aprotic, preferably polar, solvents, such as sulfones (tetramethylsulfone), sulfoxides (dimethyl sulfoxide), ketones (cyclohexanone), acid amides (dimethyl formamide), ethers (tetrahydrofurane, dioxane), and halogenated hydrocarbons (methylene chloride, chloroform, carbon tetrachloride, tetrachloroethane).

The desired modified polymers are obtained direct in the melt phase process. If the process is carried out in the presence of solvents, it is expedient to isolate the modified polymers by precipitating them from the reaction solutions, for example by cooling or by addition of non-solvents. Advantageously, they dissolve simultaneously non-reacted starting material. For example, alcohols, such as methanol or ethanol, can be used for this purpose.

The preferably thermoplastic polymers of the invention can have lower or higher viscosities than the starting polymers. The ketonic acids used for the modification also contain two functional groups, so that a cross-linking of the polymer chain can be expected to a small extent during the reaction. Their mechanical properties are only changed to a small degree. They are suitable thermoplastic polymers for the manufacture of mouldings by the conventional methods. On account of the modification, the polymers contain metal chelate-forming groups. By immersing the mouldings in metal salt solutions, it is possible to obtain an antistatic finish on the surface as a result of metal complex formation. The biological degradability (for example by bacteria or other microorganisms) can be effectively inhibited by the choice of specific heavy metal salts, such as cadmium, copper, mercury, iron, nickel or cobalt.

The combination of the properties of the polymers of the present invention for obtaining semi-permeable membranes for use in osmosis or reverse osmosis, is particularly advantageous. The good mechanical properties are retained over a prolonged period of time, as the biological degradation can be inhibited. The ability of the polymers to form metal complexes makes it possible to obtain a stationary surface polarisation on the membranes. The particular advantage of this polarisation is an increase in the separating efficiency of the membranes in reverse osmosis. An adjustment to the particular separating problem can be made as a result of the subsequent production of the surface polarisation. The desired polarisation can also be effected direct during the reverse osmosis by dissolved metal salts. A better retention of the metal salts dissolved in the water to be purified is substantially achieved with the polarisation. In addition, increased hydrophilic properties are observed, which in turn make possible an increase in the rates of flow. It is especially advantageous that the loss of mechanical properties connected with the high water absorption can be compensated for by a chelation with metal ions. The polymers of the present invention can also be used in liquid chromatography and electrophoretic methods.

The semi-permeable membranes can be asymmetrical or in the form of a thin layer. The thickness of the active layer is in general 0.05 to 0.2μ, preferably 0.1 to 0.15μ. The thickness of the asymmetrical membranes can be from 0.1 mm to 5 mm.

The following Examples illustrate the invention in more detail.

EXAMPLE 1

Acetyl cellulose (39.8% acetyl content, 17.3 g) is dissolved in dimethyl sulfoxide (60 ml) and heated to 150°–160° C. Strongly acidic ion-exchange resin (0.5 g) and diethyl succinyl succinate (50 g) are added. The reaction mixture is subsequently stirred for 2 hours at 170°–175° C. After cooling, methylene chloride (100 ml) is added and the resulting solution is poured into methanol (1500 ml). The product is precipitated and the precipitate is recrystallised twice and dried overnight at 70° C./0.1 mm, affording 14.8 g of modified cellulose acetate of relative viscosity 2.34. It has a UV absorption (in tetrahydrofurane) of max.=246 mm. It was not possible to detect free diethyl succinylsuccinate (max.=242 mm). A solution of the modified polymer (2.9 g in 1000 ml of tetrahydrofurane) has an extinction E=0.367. From this value it can be calculated that the average substitution of the monomer units is 5.5.

EXAMPLE 2

42.4 g of di-(β-hydroxyethyl)-succinyl succinate are heated to 165° C. and 15 g of powdered polymethylmethacrylate are added. The mixture is subsequently kept for 1 hour at 170° C. and then cooled. The reaction mixture is then taken up in 100 ml of methylene chloride and the product is precipitated with 1.5 liters of methanol. The precipitate is isolated, dissolved in 200 ml of methylene chloride and freed from insoluble constituents by centrifuging. A further precipitation with 1 liter of methanol yields, after drying in vacuo, 4 g of modified polymethylmethacrylate having a UV absorption band of λmax.=242 mm. The NMR spectrum shows a 14% content of succinyl succinate radicals, corresponding to an average of about 1 radical per 7 monomer units.

EXAMPLE 3 (USE EXAMPLE)

2 g of modified cellulose acetate containing on average 1 ethylsuccinyl succinate per 8 monomer units is prepared in accordance with the particulars of Example 1, powdered, and stirred for 1 hour in a saturated aqueous copper acetate solution. The modified cellulose triacetate is then isolated and initially washed with water. The copper content is determined by washing 3 times with 0.1 N hydrochloric acid and then with water. 15.8 mg of copper are detected in the washings. Repetition of the procedure with the same sample shows an increase of 13.4 mg of copper, and a further repetition shows an increase of 12 mg of copper.

By comparison, an unmodified sample of cellulose triacetate (2 g) shows an increase of only 1.6 mg, 1.2 mg and 1.1 mg of copper under the same conditions.

EXAMPLE 4 (USE EXAMPLE)

Test of the biological activity of modified acetyl cellulose films. 1 cm² of each of the following films:

I. cellulose acetate (comparison)

II. cellulose acetate of Example 3 modified with diethylsuccinyl succinate (comparison)

III. cellulose acetate treated with copper acetate (comparison)

IV. II treated with copper acetate (according to the invention) is placed either on Caso agar which has been inoculated with *Streptomyces cellulosum* using a spatula, or on malt extract agar on which fungus spores of *Chaetum globosum* have been spread with a spatula. The plates are incubated for 7 days at 28° C. Evaluation was made in accordance with the following rating:

1=film attacked by micro-organisms

2=film attacked to an insignificant extent by micro-organisms

3=film not attacked by micro-organisms

4=film not attacked by micro-organisms+inhibiting aerole

For control purposes, the films are placed on non-infected Caso agar and malt extract agar.

The results are reported in the following table:

| Strain | Agar | Cellulose sheet | Rating |
|---|---|---|---|
| control 1 | | | |
| — | | I | 1 |
| — | malt | II | 1 |
| — | extract | III | 1 |
| — | | IV | 3 |
| | | I | 1 |
| *Chaetomium* | malt | II | 1 |

| Strain | Agar | Cellulose sheet | Rating |
|---|---|---|---|
| globosum | extract | III | 1 |
|  |  | IV | 2–3 |
| control 1 |  |  |  |
| — |  | I | 1 |
| — | Caso | II | 1 |
| — | agar | III | 1 |
| — |  | IV | 3 |
|  |  | I | 1–2 |
| Streptom | Caso | II | 1–2 |
| cellulosum | agar | III | 1 |
|  |  | IV | 4* |

*strain inhibited on the entire surface.
1 The films were already infected from the start by micro-organisms which were able to replicate thereon.

Only the modified cellulose film treated with $Cu^{2+}$ ions exhibited no or only very insignificant attack by the foreign-body infections and by *Chaetum globosum* and *Streptomyces cellulosum*.

The cellulose films can be effectively protected from microbiological attack and consequent degradation by the modification and treatment with Cu ions. The modification alone does not afford protection from degradation.

EXAMPLE 5

An approx. 0.3 to 0.6 mm film of modified acetyl cellulose (acetyl content 37.2%, modified with 20 mol.% of β-hydroxyethylsuccinyl succinate) is immersed overnight in water. In this state, the film had a tensile strength of 1.6 N/mm². The film is then immersed for 4 hours in an aqueous nickel acetate solution and the tensile strength is afterwards determined again. It is now 2.9 N/mm². By comparison, the values obtained for an unmodified sheet subjected to treatment under the same conditions are 3.31 and 3.73 N/mm².

A substantially lower increase in the tensile strength of the unmodified sheet is obtained. The modification is allied to an increase in the hydrophilic properties, which diminish the mechanical properties. Surprisingly, however, the diminishment of the mechanical properties can be very largely compensated for by the treatment with salt solutions, especially of transition metals, whereby the field of use is virtually not impaired.

EXAMPLE 6

A modified cellulose acetate film prepared according to Example 1 and containing one cellulose unit substituted with diethylsuccinyl succinate per 3 cellulose units, is dissolved in a mixture of acetone/formamide and an approx. 0.4 mm asymmetric film is cast from the solution. An asymmetric film is likewise prepared from the basic cellulose acetate.

The flux F and ion retention capacity R and the changes allied to the contact of the salt solution with the membrane are determined with these films in successive steps, without changing the films, at a pressure of 40 and 60 bar and a pH value of about 3.7 using 0.1 N NaCl and $CuCl_2$ solutions. For comparison purposes, the rate of flow of pure water is simultaneously determined.

The flux is indicated in l/m²d and the ion retention capacity in %. The selectivity T Cu/Na (M) is the quotient of the copper and sodium retention.

The membranes are tested with the solutions in the following sequence and the indicated values determined:

(a) water (F H₂O)
(b) 0.1 N NaCl solution F NaCl(I), RNa (I), R Cl(I)
(c) 0.1 N $CuCl_2$ solution F $CuCl_2$(I), R Cu(I), R Cl(I)
(d) 0.1 N NaCl solution F NaCl(II), R Na(II), R Cl(II)
(e) 0.1 N $CuCl_2$ solution F $CuCl_2$(II), R Cu(II), R Cl(II)
(f) 0.1 N NaCl/0.1 N $CuCl_2$ solution F (M), R Na(M), R Cl(M)

The results are reported in the following table.

TABLE

|  | Film (invention) | | Unmodified film | |
|---|---|---|---|---|
| Properties | 40 bar | 60 bar | 40 bar | 60 bar |
| F H₂O | 748 | 2206 | 1122 | 7480 |
| F NaCl (I) | 1153 | 2244 | 374 | 1496 |
| F $CuCl_2$ (I) | 1122 | 2742 | 374 | 2057 |
| F NaCl (II) | 1421 | 2618 | 374 | 2805 |
| F $CuCl_2$ (II) | 1090 | 2306 | 598 | 1122 |
| F (M) | 935 | 2306 | 561 | 997 |
| R Na (I) | 31 | 31 | 83 | 37 |
| R Cl (I) | 27 | 29 | 79 | 29 |
| R Cu (I) | 52 | 37 | 82 | 46 |
| R Cl (I) | 34 | 12 | 84 | 48 |
| R Na (II) | 35 | 22 | 81 | 24 |
| R Cl (II) | 27 | 15 | 78 | 17 |
| R Cu (II) | 58 | 21 | 87 | 80 |
| R Cl (II) | 44 | — | 87 | 77 |
| R Na (M) | 29 | 4 | 82 | 57 |
| R Cu (M) | 50 | 15 | 88 | 60 |
| R Cl (M) | 36.5 | 12 | 83 | 54 |
| T Cu/Na (M) | 1.72 | 3.75 | 1.07 | 1.05 |

It is evident from the table that the rates of flow are substantially increased by the modified film in contact with salt-containing solutions and that the amount of waste is not as great as in the case of corresponding but modified films. A further increase can be attained by the treatment with Cu-solution [comparisons of F NaCl (I) and F NaCl (II)]. By means of the same treatment, an increase of the salt retention with respect to the cations is also obtained at lower pressure. The increase in selectivity is observed from a comparison of the separating factors [T Cu/Na (M)].

What is claimed is:

1. A semipermeable membrane prepared from a polymer selected from the group consisting of cellulose ester and cellulose ether derivatives, polyvinyl alcohol and ester derivatives thereof, copolymers of polyvinyl alcohol and vinyl esters, copolymers of vinyl esters with one or more α-olefin comonomers, and homopolymers and copolymers of acrylates and methacrylates, said polymer containing radicals of a cyclic monofunctional or difunctional β-ketonic acid or its esters which are bonded through ester groups.

2. A semipermeable membrane according to claim 1 wherein the polymer is selected from the group consisting of cellulose ester and cellulose ether derivatives.

3. A semipermeable membrane according to claim 2 wherein the cellulose ester or cellulose ether derivative additionally contains free hydroxyl groups.

4. A semipermeable membrane according to claim 1 wherein the radicals are derived from a cyclic β-ketonic acid selected from the group consisting of 1-carboxycyclopentan-2-one, 1,4-dicarboxycyclopentan-2,3-dione, 1,3-dicarboxycyclopentan-2,3-dione, 1,3-dicarboxycyclopentan-2,4-dione, 2,3-dicarboxycyclohexan-1,4-dione, 3,5-dicarboxycyclohexan-2,6-dione, 1-carboxycyclohexan-2-one or 3,6-dicarboxycyclohexane-1,4-dione.

5. A semipermeable membrane according to claim 1 wherein the radicals of the cyclic β-ketonic acid are radicals of 3,6-dicarboxycyclohexan-1,4-dione or its ester derivatives of the formula

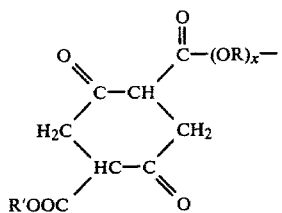

wherein R represents alkylene, cycloalkylene, benzylene, xylylene, phenylene or cyclohexane-1,4-dimethylene, R' represents alkyl, hydroxyalkyl, cycloalkyl, aryl, alkaryl or aralkyl; and x in the case of cellulose derivatives, polyvinyl alcohol or derivatives is 0, and, in the case of acrylate or methacrylate homopolymers or copolymers is 1; and wherein the average number of radicals of the cyclic β-ketonic acid or its ester derivatives that is bonded to the cellulose polymer is up to 1 radical per cellulose monomer unit; or that is bonded to the vinyl alcohol, vinyl ester, acrylate or methacrylate homopolymer or copolymer is up to 1 radical per functional monomer unit.

6. A semipermeable membrane according to claim 5 wherein R is linear or branched alkylene of 2 to 12 carbon atoms, or is cycloalkylene of 5 to 7 carbon atoms.

7. A semipermeable membrane according to claim 6 wherein R is alkylene of 2 to 6 carbon atoms.

8. A semipermeable membrane according to claim 7 wherein R is alkylene of 2 to 4 carbon atoms.

9. A semipermeable membrane according to claim 5 wherein the average number of radicals of the cyclic β-ketonic acid or its ester derivatives bonded to the cellulose polymer is from 0.01 to 1 radical per cellulose monomer unit.

10. A semipermeable membrane according to claim 9 wherein the average number of radicals of the cyclic β-ketonic acid or its ester derivatives bonded to the cellulose polymer is from 0.05 to 0.8 radical per cellulose monomer unit.

11. A semipermeable membrane according to claim 10 wherein the average number of radicals of the cyclic β-ketonic acid or its ester derivatives bonded to the cellulose polymer is from 0.1 to 0.5 radical per cellulose monomer unit.

12. A semipermeable membrane according to claim 5 wherein the average number of radicals of the cyclic β-ketonic acid or its ester derivatives bonded to the vinyl alcohol, vinyl ester, acrylate or methacrylate homopolymer or copolymer is from 0.01 to 1 radical per functional monomer unit.

13. A semipermeable membrane according to claim 12 wherein the average number of radicals of the cyclic β-ketonic acid or its ester derivatives bonded to the vinyl alcohol, vinyl ester, acrylate or methacrylate homopolymer or copolymer is from 0.05 to 0.9 radical per functional monomer unit.

14. A semipermeable membrane according to claim 13 wherein the average number of radicals of the cyclic β-ketonic acid or its ester derivatives bonded to the vinyl alcohol, vinyl ester, acrylate or methacrylate homopolymer or copolymer is from 0.1 to 0.5 radical per functional monomer unit.

15. A semipermeable membrane according to claim 1 wherein the polymer is selected from the group consisting of the homopolymers and copolymers of acrylates and methacrylates.

* * * * *